United States Patent
Chun et al.

(10) Patent No.: US 8,112,091 B2
(45) Date of Patent: Feb. 7, 2012

(54) ALLOCATING RADIO RESOURCES IN MOBILE COMMUNICATIONS SYSTEM

(75) Inventors: Sung-Duck Chun, Gyeonggi-Do (KR);
Young-Dae Lee, Gyeonggi-Do (KR);
Myung-Cheul Jung, Seoul (KR);
Sung-Jun Park, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 367 days.

(21) Appl. No.: 12/160,095

(22) PCT Filed: Jan. 5, 2007

(86) PCT No.: PCT/KR2007/000079
§ 371 (c)(1),
(2), (4) Date: Jul. 3, 2008

(87) PCT Pub. No.: WO2007/078173
PCT Pub. Date: Jul. 12, 2007

(65) Prior Publication Data
US 2008/0305819 A1 Dec. 11, 2008

Related U.S. Application Data

(60) Provisional application No. 60/757,063, filed on Jan. 5, 2006, provisional application No. 60/783,700, filed on Mar. 16, 2006.

(30) Foreign Application Priority Data

Sep. 12, 2006 (KR) .................. 10-2006-0088273

(51) Int. Cl.
*H04B 7/00* (2006.01)

(52) U.S. Cl. ............. 455/450; 455/451; 455/452.1; 455/452.2; 455/453; 455/509; 370/458

(58) Field of Classification Search .......... 455/450–455, 455/464, 509, 436–444, 33.2; 370/310–350
See application file for complete search history.

(56) References Cited

U.S. PATENT DOCUMENTS 6,138,158 A   10/2000  Boyle et al.
6,317,430 B1  11/2001  Knisely et al.
(Continued)

FOREIGN PATENT DOCUMENTS

CN        1411668        4/2003
(Continued)

OTHER PUBLICATIONS

Haardt, Martin et al. The TD-CDMA Based Utra TDD Mode, Aug. 2000, IEEE Journal on Selected Areas in Communications, vol. 18, pp. 1375-1385.*

(Continued)

*Primary Examiner* — Ajit Patel
*Assistant Examiner* — Erica Navar
(74) *Attorney, Agent, or Firm* — Lee, Hong, Degerman, Kang & Waimey (57) ABSTRACT

Allocating radio resources in a mobile communication system, comprises transmitting first information to a network, wherein the first information is utilized by the network to allocate radio resources to a mobile terminal for allowing communication between the mobile terminal and the network, and receiving second information from the network, wherein the second information is related to an allocation of radio resources for the mobile terminal.

11 Claims, 6 Drawing Sheets

U.S. PATENT DOCUMENTS

| | | |
|---|---|---|
| 6,381,229 B1 | 4/2002 | Narvinger et al. |
| 6,480,525 B1 | 11/2002 | Parsa et al. |
| 6,571,102 B1 | 5/2003 | Hogberg et al. |
| 6,597,668 B1 | 7/2003 | Schafer et al. |
| 6,694,148 B1 | 2/2004 | Frodigh et al. |
| 6,717,925 B1 | 4/2004 | Leppisaari et al. |
| 6,728,225 B1 | 4/2004 | Ozluturk |
| 6,785,510 B2 | 8/2004 | Larsen |
| 6,795,412 B1 | 9/2004 | Lee |
| 6,850,504 B1 | 2/2005 | Cao et al. |
| 6,859,445 B1 | 2/2005 | Moon et al. |
| 6,882,727 B1 | 4/2005 | Vialen et al. |
| 6,907,005 B1 * | 6/2005 | Dahlman et al. ............... 370/236 |
| 6,907,015 B1 | 6/2005 | Moulsley et al. |
| 6,947,394 B1 | 9/2005 | Johansson et al. |
| 6,950,420 B2 | 9/2005 | Sarkkinen et al. |
| 6,965,580 B1 | 11/2005 | Takagi et al. |
| 7,016,343 B1 | 3/2006 | Mermel et al. |
| 7,031,708 B2 | 4/2006 | Sarkkinen et al. |
| 7,075,971 B2 | 7/2006 | Parsa et al. |
| 7,099,309 B2 | 8/2006 | Davidson |
| 7,145,895 B2 | 12/2006 | Mueckenheim et al. |
| 7,151,758 B2 | 12/2006 | Kumaki et al. |
| RE39,454 E | 1/2007 | Cantoni et al. |
| 7,184,792 B2 | 2/2007 | Mir |
| 7,236,787 B1 | 6/2007 | Tamura et al. |
| 7,359,345 B2 | 4/2008 | Chang et al. |
| 7,359,349 B2 | 4/2008 | Kayama et al. |
| 7,376,424 B2 | 5/2008 | Kim et al. |
| 7,385,952 B2 | 6/2008 | Mantha et al. |
| 7,398,108 B2 | 7/2008 | Hondo |
| 7,430,206 B2 | 9/2008 | Terry et al. |
| 7,436,801 B1 | 10/2008 | Kanterakis |
| 7,443,816 B2 | 10/2008 | Chen et al. |
| 7,496,113 B2 | 2/2009 | Cai et al. |
| 7,535,886 B2 | 5/2009 | Lee et al. |
| 7,590,089 B2 | 9/2009 | Park et al. |
| 7,664,059 B2 | 2/2010 | Jiang |
| 7,729,719 B2 | 6/2010 | Bergstrom et al. |
| 7,778,599 B2 | 8/2010 | Li et al. |
| 7,826,859 B2 | 11/2010 | Lee et al. |
| 7,848,308 B2 | 12/2010 | Lee et al. |
| 2001/0024956 A1 | 9/2001 | You |
| 2001/0046864 A1 | 11/2001 | Bhatoolaul et al. |
| 2002/0009129 A1 | 1/2002 | Choi et al. |
| 2002/0021714 A1 | 2/2002 | Seguin |
| 2002/0028690 A1 | 3/2002 | McKenna et al. |
| 2002/0032884 A1 | 3/2002 | Kobata et al. |
| 2002/0044527 A1 | 4/2002 | Jiang |
| 2002/0071480 A1 | 6/2002 | Marjelund et al. |
| 2002/0090004 A1 | 7/2002 | Rinchiuso |
| 2002/0093940 A1 | 7/2002 | Toskala |
| 2002/0126629 A1 | 9/2002 | Jiang et al. |
| 2002/0160744 A1 | 10/2002 | Choi |
| 2002/0181436 A1 | 12/2002 | Mueckenheim |
| 2002/0187789 A1 | 12/2002 | Diachina |
| 2002/0191559 A1 | 12/2002 | Chen et al. |
| 2003/0003920 A1 | 1/2003 | Sebastian |
| 2003/0007510 A1 | 1/2003 | Yeo et al. |
| 2003/0043741 A1 | 3/2003 | Mukai et al. |
| 2003/0050097 A1 | 3/2003 | Amirijoo et al. |
| 2003/0054829 A1 | 3/2003 | Moisio |
| 2003/0076812 A1 | 4/2003 | Benedittis |
| 2003/0078046 A1 | 4/2003 | Seo |
| 2003/0103476 A1 | 6/2003 | Choi et al. |
| 2003/0131124 A1 | 7/2003 | Yi et al. |
| 2003/0137931 A1 | 7/2003 | Hans et al. |
| 2003/0139170 A1 | 7/2003 | Heo |
| 2003/0147371 A1 | 8/2003 | Choi |
| 2003/0210669 A1 | 11/2003 | Vayanos et al. |
| 2003/0223393 A1 | 12/2003 | Lee |
| 2003/0236085 A1 | 12/2003 | Ho |
| 2004/0002334 A1 | 1/2004 | Lee et al. |
| 2004/0004954 A1 | 1/2004 | Terry et al. |
| 2004/0006643 A1 | 1/2004 | Dolson et al. |
| 2004/0008658 A1 | 1/2004 | Dahlman et al. |
| 2004/0008659 A1 | 1/2004 | Kim |
| 2004/0014452 A1 | 1/2004 | Lim et al. |
| 2004/0028078 A1 | 2/2004 | Beckmann |
| 2004/0057387 A1 | 3/2004 | Yi et al. |
| 2004/0077357 A1 | 4/2004 | Nakada |
| 2004/0097192 A1 | 5/2004 | Schiff |
| 2004/0103435 A1 | 5/2004 | Yi et al. |
| 2004/0109422 A1 | 6/2004 | Naito |
| 2004/0114606 A1 | 6/2004 | Haddad |
| 2004/0116143 A1 | 6/2004 | Love et al. |
| 2004/0117860 A1 | 6/2004 | Yi et al. |
| 2004/0125772 A9 | 7/2004 | Wu et al. |
| 2004/0127223 A1 | 7/2004 | Li et al. |
| 2004/0143676 A1 | 7/2004 | Baudry et al. |
| 2004/0147266 A1 | 7/2004 | Hwang et al. |
| 2004/0147271 A1 | 7/2004 | Billon et al. |
| 2004/0157602 A1 | 8/2004 | Khawand |
| 2004/0171395 A1 | 9/2004 | Shin |
| 2004/0180675 A1 | 9/2004 | Choi et al. |
| 2004/0184437 A1 | 9/2004 | Lee et al. |
| 2004/0185860 A1 | 9/2004 | Marjelund |
| 2004/0196861 A1 | 10/2004 | Rinchiuso et al. |
| 2004/0198369 A1 | 10/2004 | Kwak et al. |
| 2004/0202140 A1 | 10/2004 | Kim et al. |
| 2004/0208160 A1 | 10/2004 | Petrovic et al. |
| 2004/0219920 A1 * | 11/2004 | Love et al. .................... 455/442 |
| 2004/0229626 A1 | 11/2004 | Yi et al. |
| 2004/0264497 A1 | 12/2004 | Wang et al. |
| 2004/0264550 A1 | 12/2004 | Dabak |
| 2005/0008035 A1 | 1/2005 | Eklund et al. |
| 2005/0014508 A1 | 1/2005 | Moulsley et al. |
| 2005/0020260 A1 | 1/2005 | Jeong et al. |
| 2005/0025039 A1 | 2/2005 | Hwang et al. |
| 2005/0039101 A1 | 2/2005 | Torsner |
| 2005/0054368 A1 | 3/2005 | Amerga |
| 2005/0059407 A1 | 3/2005 | Reed et al. |
| 2005/0059421 A1 | 3/2005 | Reed et al. |
| 2005/0073987 A1 | 4/2005 | Wu |
| 2005/0105482 A1 | 5/2005 | Kobayashi et al. |
| 2005/0107036 A1 | 5/2005 | Song et al. |
| 2005/0118947 A1 | 6/2005 | Ames et al. |
| 2005/0157696 A1 | 7/2005 | Yamamoto et al. |
| 2005/0185608 A1 | 8/2005 | Lee |
| 2005/0190728 A1 | 9/2005 | Han et al. |
| 2005/0197134 A1 | 9/2005 | McKenna et al. |
| 2005/0207374 A1 | 9/2005 | Petrovic et al. |
| 2005/0213605 A1 | 9/2005 | Kim et al. |
| 2005/0243767 A1 * | 11/2005 | Zhang et al. .................. 370/329 |
| 2005/0249141 A1 | 11/2005 | Lee et al. |
| 2005/0249222 A1 | 11/2005 | van Kampen et al. |
| 2005/0250500 A1 | 11/2005 | Xu |
| 2005/0260997 A1 | 11/2005 | Korale |
| 2005/0265301 A1 | 12/2005 | Heo et al. |
| 2005/0271025 A1 | 12/2005 | Guethaus et al. |
| 2005/0281212 A1 | 12/2005 | Jeong et al. |
| 2005/0288026 A1 | 12/2005 | Byun et al. |
| 2006/0007886 A1 | 1/2006 | Lee et al. |
| 2006/0018289 A1 | 1/2006 | Schulist et al. |
| 2006/0025079 A1 | 2/2006 | Sutskover et al. |
| 2006/0045047 A1 | 3/2006 | Choi et al. |
| 2006/0059186 A1 | 3/2006 | Backlund |
| 2006/0062196 A1 | 3/2006 | Cai et al. |
| 2006/0088009 A1 | 4/2006 | Gibbs et al. |
| 2006/0146745 A1 | 7/2006 | Cai et al. |
| 2006/0153232 A1 | 7/2006 | Shvodian |
| 2006/0168343 A1 | 7/2006 | Ma et al. |
| 2006/0193282 A1 | 8/2006 | Ikawa et al. |
| 2006/0256818 A1 | 11/2006 | Shvodian et al. |
| 2006/0292982 A1 | 12/2006 | Ye et al. |
| 2007/0060146 A1 | 3/2007 | Won et al. |
| 2007/0081513 A1 | 4/2007 | Torsner |
| 2007/0099619 A1 | 5/2007 | Parekh et al. |
| 2007/0121543 A1 | 5/2007 | Kuchibhotla et al. |
| 2007/0135080 A1 | 6/2007 | Islam et al. |
| 2007/0140115 A1 | 6/2007 | Bienas et al. |
| 2007/0147326 A1 | 6/2007 | Chen |
| 2007/0206531 A1 | 9/2007 | Pajukoski et al. |
| 2008/0031253 A1 | 2/2008 | Kim et al. |
| 2008/0095105 A1 | 4/2008 | Sundberg et al. |
| 2008/0232291 A1 | 9/2008 | Hus et al. |
| 2009/0011769 A1 | 1/2009 | Park et al. |

| | | |
|---|---|---|
| 2009/0175241 A1 | 7/2009 | Ohta et al. |
| 2009/0185477 A1 | 7/2009 | Lee et al. |
| 2009/0323646 A1 | 12/2009 | Ketchum et al. |
| 2010/0014430 A1 | 1/2010 | Oka |
| 2010/0034095 A1 | 2/2010 | Ho et al. |
| 2010/0103899 A1 | 4/2010 | Kwak et al. |
| 2010/0105334 A1 | 4/2010 | Terry et al. |
| 2011/0038376 A1 | 2/2011 | Wiemann et al. |

FOREIGN PATENT DOCUMENTS

| | | |
|---|---|---|
| CN | 1663158 | 8/2005 |
| EP | 0978958 | 2/2000 |
| EP | 1009184 | 6/2000 |
| EP | 1261222 | 11/2002 |
| EP | 1392074 | 2/2004 |
| EP | 1441473 | 7/2004 |
| EP | 1478203 | 11/2004 |
| EP | 1557968 | 7/2005 |
| EP | 1599063 | 11/2005 |
| EP | 1605724 | 12/2005 |
| EP | 1684538 | 1/2006 |
| JP | 06-013959 | 1/1994 |
| JP | 09-186704 | 7/1997 |
| JP | 09-327072 | 12/1997 |
| JP | 11-308671 | 11/1999 |
| JP | 11-331949 | 11/1999 |
| JP | 2000-032088 | 1/2000 |
| JP | 2000-151494 | 5/2000 |
| JP | 2000-175271 | 6/2000 |
| JP | 2000-184428 | 6/2000 |
| JP | 2001-095031 | 4/2001 |
| JP | 2001-298770 | 10/2001 |
| JP | 2001-522557 | 11/2001 |
| JP | 2002501695 | 1/2002 |
| JP | 2002-135231 | 5/2002 |
| JP | 2002-374321 | 12/2002 |
| JP | 2003-008635 | 1/2003 |
| JP | 2003-504942 | 2/2003 |
| JP | 2003504968 | 2/2003 |
| JP | 2003-174470 | 6/2003 |
| JP | 2003-333661 | 11/2003 |
| JP | 2004-128967 | 4/2004 |
| JP | 2004-312771 | 11/2004 |
| JP | 2004-320165 | 11/2004 |
| JP | 2004-349884 | 12/2004 |
| JP | 2005500761 | 1/2005 |
| JP | 2005-510950 | 4/2005 |
| JP | 2005510950 | 4/2005 |
| JP | 2005-517369 | 6/2005 |
| JP | 2005522923 | 7/2005 |
| JP | 2005-217743 | 8/2005 |
| JP | 2005-525720 | 8/2005 |
| JP | 2005525066 | 8/2005 |
| JP | 2005-236988 | 9/2005 |
| JP | 2005-237013 | 9/2005 |
| JP | 2005-244958 | 9/2005 |
| JP | 2005-278167 | 10/2005 |
| JP | 2005-536168 | 11/2005 |
| JP | 2005-539462 | 12/2005 |
| JP | 2006-014372 | 1/2006 |
| JP | 2006-020044 | 1/2006 |
| JP | 2006-505998 | 2/2006 |
| JP | 2006-352705 | 12/2006 |
| JP | 2007536790 | 12/2007 |
| KR | 1020010111634 | 12/2001 |
| KR | 1020010111637 | 12/2001 |
| KR | 1020040048675 | 6/2004 |
| KR | 1020040064867 | 7/2004 |
| KR | 1020040089937 | 10/2004 |
| RU | 2168278 | 5/2001 |
| RU | 2183387 | 6/2002 |
| RU | 2191479 | 10/2002 |
| RU | 2232469 | 7/2004 |
| RU | 2232477 | 7/2004 |
| RU | 2237380 | 9/2004 |
| RU | 2263415 | 10/2005 |
| RU | 2005115869 | 10/2005 |
| RU | 2270526 | 2/2006 |
| TW | 407407 | 10/2000 |
| TW | 552815 | 9/2003 |
| TW | 586283 | 5/2004 |
| TW | 589818 | 6/2004 |
| TW | 592412 | 6/2004 |
| TW | I228008 | 2/2005 |
| TW | I229268 | 3/2005 |
| TW | I229514 | 3/2005 |
| TW | 200522579 | 7/2005 |
| TW | I237478 | 8/2005 |
| TW | I239731 | 9/2005 |
| TW | I239756 | 9/2005 |
| TW | I242951 | 11/2005 |
| TW | 280755 | 5/2007 |
| WO | 9960729 | 11/1999 |
| WO | 99/63713 | 12/1999 |
| WO | 01/035586 | 5/2001 |
| WO | 02/39697 | 5/2002 |
| WO | 02/39760 | 5/2002 |
| WO | 02/043403 | 5/2002 |
| WO | 02/47417 | 6/2002 |
| WO | 02/102110 | 12/2002 |
| WO | 03/007636 | 1/2003 |
| WO | 03/017691 | 2/2003 |
| WO | 03/043259 | 5/2003 |
| WO | 03/047155 | 6/2003 |
| WO | 03/056723 | 7/2003 |
| WO | 03/096571 | 11/2003 |
| WO | 2004/030393 | 4/2004 |
| WO | 2004/034656 | 4/2004 |
| WO | 2004/045234 | 5/2004 |
| WO | 2004/089030 | 10/2004 |
| WO | 2004/091130 | 10/2004 |
| WO | 2005/006660 | 1/2005 |
| WO | 2005/018269 | 2/2005 |
| WO | 2005/034418 | 4/2005 |
| WO | 2005/036917 | 4/2005 |
| WO | 2005/055472 | 6/2005 |
| WO | 2005/074312 | 8/2005 |
| WO | 2005/088886 | 9/2005 |
| WO | 2005099125 | 10/2005 |
| WO | 2005/109695 | 11/2005 |
| WO | 2005/109837 | 11/2005 |
| WO | 2005/117317 | 12/2005 |
| WO | 2005/119941 | 12/2005 |
| WO | 2005/125125 | 12/2005 |
| WO | 2006/011953 | 2/2006 |
| WO | 2006/012946 | 2/2006 |
| WO | 2006/033552 | 3/2006 |
| WO | 2007/095966 | 8/2007 |
| WO | 2007091831 | 8/2007 |

OTHER PUBLICATIONS

Ericsson, "E-UTRA Random Access"; TSG-RAN WG1 #43; Seoul, Korea; Nov. 2005; R1-051445.

Sarkar, S., et al., "Common-Channel Soft Handoff in CDMA2000," IEEE Transactions on Microwave Theory and Techniques, Jun. 2000, pp. 938-950, vol. 48, Issue 6.

NTT Docomo, et al., "Multiplexing Method of Shared Control Channel in Uplink Single-Carrier FDMA Radio Access," 3GPP TSG-RAN WG1, R1-051143, Oct. 10, 2005.

Huawei, "Further Considerations on Multiplexing Method of Shared Control Channel in Uplink Single-Carrier FDMA," 3GPP TSG-RAN WG1, R1-051430, Nov. 7, 2005.

Philips, "Evolved Paging Indicators for LTE," 3GPP TSG-RAN WG2, R2-052985, Nov. 7, 2005.

NTT Docomo, et al., "Paging Channel Structure for E-UTRA Downlink," 3GPP TSG-RAN WG1, R1-060034, Jan. 23, 2006.

LG Electronics Inc., "HARQ and ARQ Operation," 3GPP TSG-RAN WG2, R2-060106, Jan. 9, 2006.

LG Electronics Inc., "Framing in the MAC Entity," 3GPP TSG-RAN WG2, R2-061012, Mar. 27, 2006.

Motorola, "Paging Channel Design for E-UTRA," 3GPP TSG-RAN WG1, R1-061712, Jun. 27, 2006.

Xu, H., et al.; "Performance Analysis on the Radio Link Control Protocol of UMTS System"; 2002 IEEE 56th Vehicular Technology Conference Proceedings; pp. 2026-2030; Sep. 2002.

Siemens, "States in E-UTRAN," R2-052051, 3GPP TSG-RAN WG RAN2#48, Aug. 2005.
China Mobile Communications Co., "RRC States Analysis in LTE," R2-052140, 3GPP TSG RAN WG2 #48, Aug. 2005.
Qualcomm Europe, "Signaling optimization for E-UTRAN," R2-052407, 3GPP TSG-RAN WG 2 meeting #48-bis, Oct. 2005.
Panasonic, "E-UTRA Transport and Logical Channels," R2-052860, 3GPP TSG RAN WG2#49, Nov. 2005.
Ericsson, "LTE States in E-UTRAN," R2-052425, TSG-RAN WG2 Meeting #48bis, Oct. 2005.
LG Electronics Inc., "UE State Transition in LTE_ACTIVE," R2-061002, 3GPP TSG-RAN WG2 #52, Mar. 2006.
LTE, "3rd Generation Partnership Project; Technical Specification Group Radio Access Network; Evolved Universal Terrestrial Radio Access (E-UTRA) Medium Access Control (MAC) protocol specification", 3GPP TS 36.321 V8.4.0, Dec. 2008.
Ericsson, "Solution for sending NAS together with RRC connection request",3GPP TSG-RAN WG2#58, R2-071817, May 7, 2007.
LG Electroncs Inc "Default SRB for initial access", 3GPP TSG-RAN WG 2 LTE Ad-hoc, R2-061958, Jun. 27, 2006.
Qualcomm, "Need for MAC-hs segmentation mechanism," R2-020769, 3GPP TSG-RAN WG2 meeting #28, Apr. 2002.
Motorola et al., "MAC-e/es header and functional split," R2-042360, 3GPP TSG RAN WG2 Meeting#45, Nov. 2004.
Ericsson, "User plane protocol enhancements," R2-052749, TSG-RAN WG2 Meeting #48bis, Oct. 2005.
LG Electronics Inc., "MAC Enhancement," R2-060561, 3GPP TSG-RAN WG2 #51, Feb. 2006.
LG Electronics, Inc., "UE state transition in LTE_ACTIVE", 3GPP TSG-RAN WG2 #52, R2-061002, Mar. 2006.

* cited by examiner

ALLOCATING RADIO RESOURCES IN MOBILE COMMUNICATIONS SYSTEM

CROSS-REFERENCE TO RELATED APPLICATIONS

This application is the National Stage filing under 35 U.S.C. §371 of International Application No. PCT/KR2007/000079, filed on Jan. 5, 2007, which claims the benefit of U.S. Provisional Application Nos. 60/757,063, filed on Jan. 5, 2006, and 60/783,700, filed on Mar. 16, 2006, and claims the benefit of earlier filing date and right to priority to Korean Application No. 10-2006-0088273, filed on Sep. 12, 2006.

DISCLOSURE OF INVENTION

Technical Solution

This disclosure relates to allocating radio resources in a mobile communications system.

Figure 1:
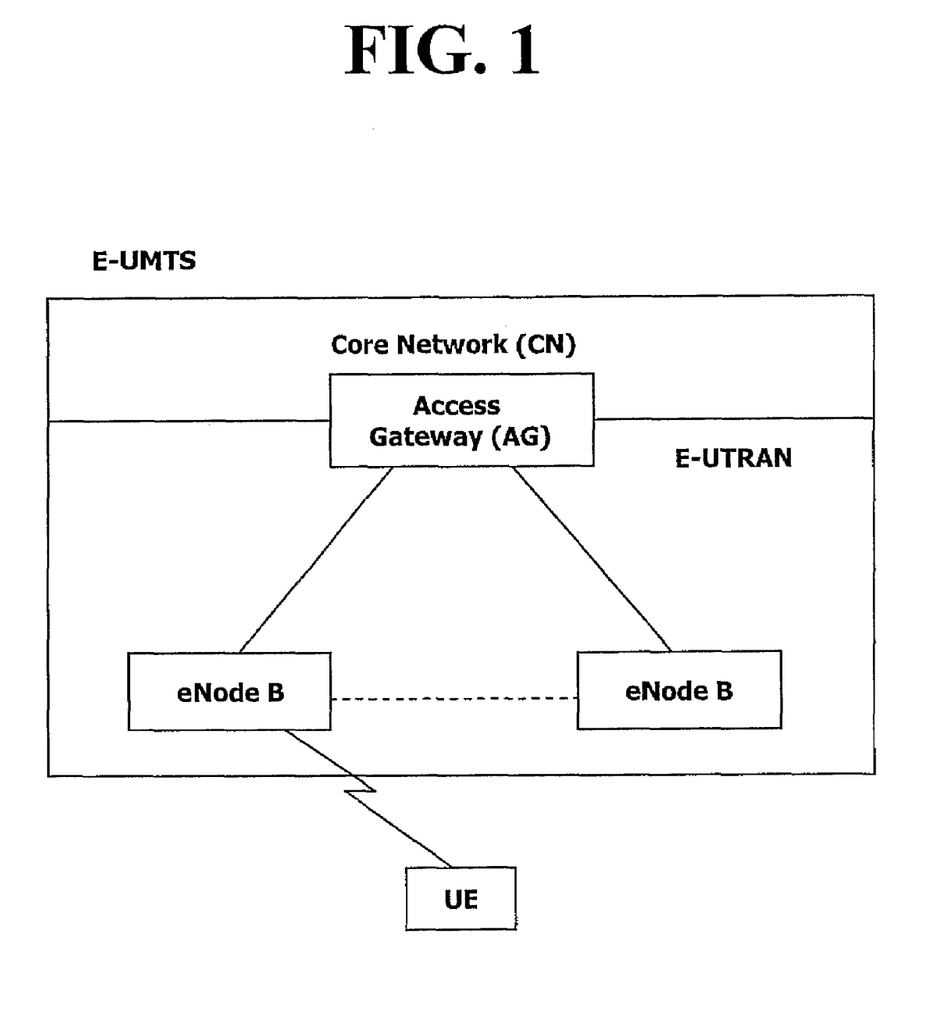
FIG. 1 illustrates an exemplary network structure of an Evolved Universal Mobile Telecommunications System (E-UMTS).

FIG. 1 illustrates an exemplary network structure of an Evolved Universal Telecommunications System (E-UMTS). The E-UMTS developed from an existing Universal Telecommunications System (UMTS). Standardization of the E-UMTS is currently being developed by the Third Generation Partnership Project (3GPP). The E-UMTS may also be called a Long Term Evolution (LTE) system.

Referring to FIG. 1, an E-UMTS network may consist of an Evolved UMTS terrestrial radio access network (E-UTRAN) and a core network (CN). The E-UTRAN includes a base station (eNode B or eNB). The CN includes an Access Gateway (AG), which is a node adapted for user registration of a user equipment (UE). The AG may be divided into a first portion for processing user traffic and a second portion for processing control traffic. The AG portion for processing the user traffic and the AG portion for processing the control traffic can be connected to each other via a communication interface. At least one or more cells may exist in a single eNode B (eNB). An interface for transmitting the user traffic and/or the control traffic can be used between eNode Bs. Also, in the E-UMTS of FIG. 1, an interface for discriminating between the E-UTRAN and the CN can be used.

Radio interface protocol layers between a mobile terminal and network may be classified into a first layer (L1), a second layer (L2) and a third layer (L3) based on three lower layers of a well-known interconnection scheme, such as an open system interconnection (OSI) reference model. Among these, the first layer provides an information transfer service using a physical layer.

A radio resource control (RRC) layer positioned in the third layer serves to control radio resources between the mobile terminal and the network. Accordingly, the RRC layer allows an RRC message exchange between the mobile terminal and the network. The RRC layer may be positioned in both the eNode B and AG, or positioned in one of the eNode B and AG.

Figure 2:
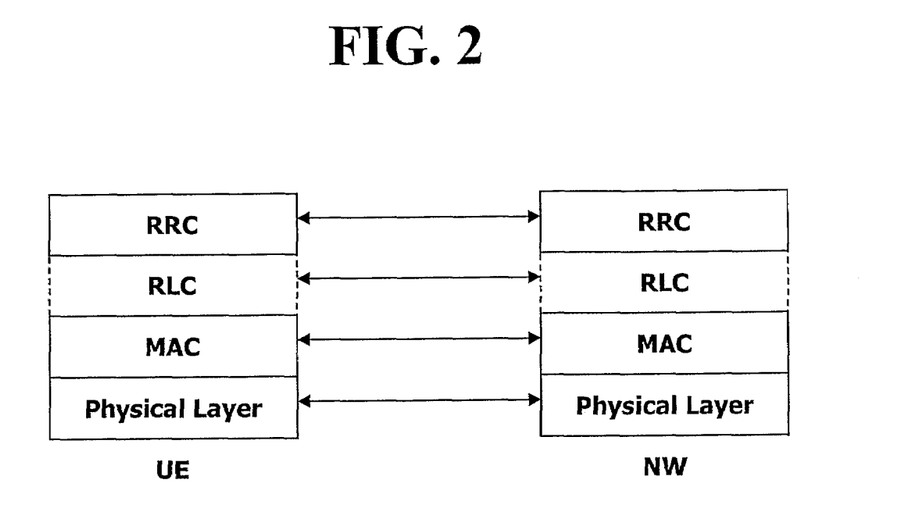
FIG. 2 illustrates a control plane architecture for radio interface protocols between a mobile terminal and a UMTS terrestrial radio access network (UTRAN) based on a 3GPP radio access network specification.
Figure 3:
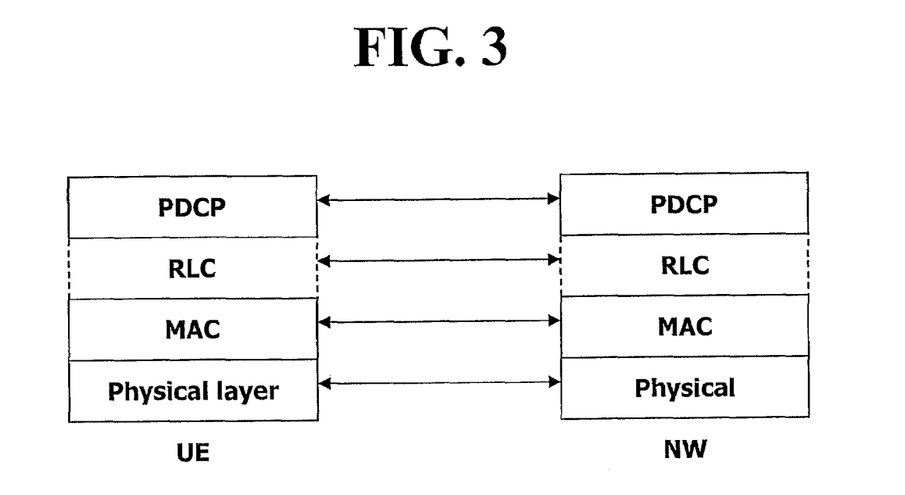
FIG. 3 illustrates a user plane architecture for radio interface protocols between a mobile terminal and a UMTS terrestrial radio access network (UTRAN) based on a 3GPP radio access network specification.

FIGS. 2 and 3 illustrate architectures for radio interface protocols between a mobile terminal and a UMTS terrestrial radio access network (UTRAN) based on a 3GPP radio access network specification. The radio interface protocols of FIGS. 2 and 3 are horizontally formed of a physical layer, a data link layer and a network layer. Vertically, the radio interface protocols are formed of a user plane for transmitting data information and a control plane for transmitting control signals. The protocol layers of FIGS. 2 and 3 may be divided into a first layer (L1), a second layer (L2) and a third layer (L3) based on three lower layers of a well-known interconnection scheme, such as an open system interconnection (OSI) reference model.

Hereinafter, radio protocol layers of the control plane illustrated in FIG. 2 and the user plane illustrated in FIG. 3 will be explained. As stated above, a physical layer provides an information transfer service to an upper layer. The physical layer is connected to an upper layer, such as a medium access control (MAC) layer, via a transport channel. Data is transferred between the MAC layer and the physical layer via the transport channel. Data is also transferred between different physical layers, such as a physical layer of a transmitting side and a physical layer of a receiving side.

The MAC layer is positioned in the second layer and provides a service via a logical channel to an upper layer, such as a radio link control (RLC) layer. The RLC layer may also positioned in the second layer and supports reliable data transmission. Notably, a function performed by the RLC layer may be implemented as a functional block within the MAC. In this case, the RLC layer may not exist. A Packet Data Convergence Protocol (PDCP) layer is positioned in the second layer above the RLC layer. The PDCP layer is used to effectively transmit data using an IP packet, such as an IPv4 or IPv6, on a radio interface with a relatively small bandwidth. For this purpose, the PDCP layer reduces unnecessary control information via a function, such as header compression.

A radio resource control (RRC) layer located at a lowest portion of the third layer is defined in the control plane. The RRC layer handles transport channels and physical channels for the configuration, re-configuration and release of radio bearers. Here, a radio bearer (RB) denotes a service provided by the second layer for data transfer between the mobile terminal and the UTRAN.

Downlink transport channels for transmitting data from a network to a mobile terminal may include a broadcast channel (BCH) for transmitting system information and a downlink shared channel (SCH) for transmitting user traffic or a control message. The user traffic or the control message of a downlink multicast or broadcast service may be transmitted via the downlink SCH or via a separate downlink multicast channel (MCH). Uplink transport channels for transmitting data from a mobile terminal to a network may include a random access channel (RACH) for transmitting an initial control message and an uplink shared channel (SCH) for transmitting user traffic or a control message.

In the related art, when a mobile terminal cannot connect with a gateway (i.e., AG) for traffic transmission, or when the mobile terminal can no longer be connected because of its mobility, or when the gateway cannot be sustained because of other operations, the mobile terminal connects to a gateway suitable for a base station of an area into which the mobile terminal has moved into. In this respect, however, the change to the new gateway increases traffic congestion of the network because of context information exchanged between the gateways and signaling message transmissions between many base stations and gateways, and the like.

Hereinafter, the RLC layer will be explained. The RLC layer basically guarantees a quality of service (QoS) of each RB and their corresponding data transmissions. Because the RB service is a service provided to an upper layer by the second layer of the radio protocols, the entire second layer may impact the QoS. Particularly, the RLC layer greatly influences the QoS. The RLC establishes an independent RLC entity for each RB to guarantee a unique QoS of the RB.

The RLC provides three modes, namely, a transparent mode (TM), an unacknowledged mode (UM) and an acknowledged Mode (AM) to support various QoSs. The three RLC modes support QoS in different manners, respectively, and adapt different operation methods accordingly. Also, detailed functions of the three operation modes are different from one another. Therefore, each of the operation modes (i.e., TM, UM and AM) of the RLC will be described in more detail.

In a UM RLC mode, no reception acknowledgment is received for transmitted data. In an AM RLC mode, a reception acknowledgment is received for transmitted data. When transmitting data in the unacknowledged mode (UM), the UM RLC adds a PDU header, including a sequence number (SN), to each PDU and transmits the PDU to a receiving side. Accordingly, the receiving side can know specifically which PDU is lost during transmission. The UM RLC handles on the user plane the transmission of broadcast/multicast data or real-time packet data such as voice (e.g., VoIP) or streaming in a packet service domain. The UM RLC handles on the control plane the transmission of RRC messages that do not require a reception acknowledgement when the RRC messages are transmitted to a specific terminal within a cell or a specific terminal group within a cell region.

Similar to the UM RLC, the AM RLC configures a PDU by adding a PDU header having an SN to the PDU. However, the difference between the UM RLC and the AM RLC is that a receiving side acknowledges whether the PDU transmitted by a transmitting side has been successfully received. Notably, when providing the acknowledgement, the receiving side may request the transmitting side to retransmit an unsuccessfully received PDU. Thus, the retransmission function is a distinctive feature of the AM RLC.

The AM RLC aims to guarantee error-free data transmission via use of the retransmission function. Accordingly, the AM RLC handles on the user plane the transmission of non-real-time packet data such as Transport Control Protocol/Internet Protocol (TCP/IP) data in a packet service region. Also, the AM RLC handles on the control plane the transmission of RRC messages that require a reception acknowledgement when the RRC messages are transmitted to a specific terminal within a cell or a specific terminal group.

The TM RLC and the UM RLC are used in uni-directional communication. However, the AM RLC is used in bi-directional communication because of the feedback function from the receiving side. Because the bi-directional communication is usually used in a point-to-point communication, the AM RLC uses a dedicated channel.

The AM RLC is complicated because it performs the retransmission function. Particularly, the AM RLC is provided with a retransmission buffer in addition to a transmitting/receiving buffer to manage the retransmission. The AM RLC performs various functions including use of a transmission/reception window for flow control, a polling function for when a transmitting side requests status information from a receiving side of a peer RLC entity, a status information report function such as when the receiving side reports its buffer state to a transmitting side of the peer RLC entity, use of a status PDU for delivering status information, and piggybacking for inserting the status PDU in a data PDU to increase data transmission efficiency, for example.

The AM RLC also uses a reset PDU for requesting a reset of all operations and parameters from a counterpart AM RLC entity when the requesting AM RLC entity finds a critical error during the operation. Accordingly, a reset ACK PDU is used to respond to the reset PDU, and the like. The AM RLC uses several protocol parameters, state variables and a timer to support such functions.

PDUs, such as the status information report PDU, the status PDU and the reset PDU, are used to control data transmission in the AM RLC. Such PDUs are referred to as control PDUs. PDUs used to transfer user data is referred to as data PDUs. Therefore, the AM RLC generally uses two types of PDUs, the data PDU and the control PDU.

The E-UMTS is configured with a base station and a terminal. Radio resources in one cell comprise an uplink radio resource and a downlink radio resource. The base station manages allocation and control of the uplink and downlink radio resources of the one cell. Specifically, the base station determines conditions or situations, such as which terminal uses the radio resources, when to use the radio resources, what amount of radio resources to use, and what types of radio resources to use. For example, a base station can determine the transmission of downlink data to a first user for 0.2 seconds on a frequency of 100 Mhz to 101 Mhz after 3.2 seconds have elapsed. Accordingly, the base station informs the corresponding terminal of the determination to allow the terminal to receive the downlink data. Similarly, the base station can determine whether to transmit data based on the conditions or situations (i.e., when to use the radio resources, what amount of radio resources to use, what types of radio resources to use, which terminal uses the radio resources, etc.). The base station also informs the terminal of the determination to allow the terminal to transmit data within the determined time period.

In E-UTRAN system, the base station dynamically manages the radio resources to increase data transmission efficiency. However in UTRAN system, radio resources are managed such that one terminal can continuously use one radio resource during a call connection. This is unreasonable given that various services may be currently provided based on an IP packet. For example, for most packet data services, a packet is generated intermittently rather than being generated continuously. Hence, it is inefficient for the base station to continuously allocate the radio resource to the terminal.

In the E-UTRAN system, the radio resource is allocated to a terminal in the afore-mentioned manner while a terminal has data to transmit. In order words, the E-UTRAN allocates resources to the terminal only when the terminal requires the radio resource. In this respect, in order to transmit more data to more terminals while using a smaller amount of radio resources, the base station requires more information, and controls and manages radio resources more strictly.

For example, if there are three terminals in a single cell, it may be that a first terminal performs voice call communication, a second terminal performs Internet browsing, and a third terminal does not perform a call communication.

When the voice call communication is performed, a user of the first terminal and another party may speak with each other at any time. However, the quality of the conversation may be diminished if a voice sound is delayed. Therefore, for the voice call communication, the base station continuously allocates a radio resource.

With regard to the second terminal performing Internet browsing, a user of the terminal may be reading an online (Internet) newspaper, for example. In this case, when the user's desired page is displayed on a screen, the user will view the contents of the page during a certain time. During this time, no data is transmitted. Thus, when browsing the Internet, data is first transmitted for a short time. Thereafter, the terminal falls into a state where no data is transmitted. As a result, the base station may allocate radio resources accordingly.

With regard to a user of the third terminal not performing a call communication, allocation of radio resources is not necessary.

The present inventors recognized at least the following problems in currently existing procedures for radio resource allocation. As noted with the above-described cases, the base station allocates radio resources differently according to the particular situations the terminal is in. Additionally, in order to provide more data to more terminals, the base station should consider a usage time of the terminal. For example, when there is no data to be transmitted or received, data should be transmitted through the uplink of the terminal. Also, the time for discriminating whether there is data to be received through the downlink should be shortened. Otherwise, a standby time of the terminal is inevitably increased. Based upon such problem recognition, various features and aspects described herein have been conceived by the present inventors.

This disclosure is directed to allocating radio resources in a mobile communication system.

Additional features and aspects will be set forth in the description that follows, and in part will be apparent from the description, or may be learned by practice of such features. The features and aspects may be realized and attained by the structure particularly pointed out in the written description and claims hereof as well as the appended drawings.

To achieve these and other features and aspects, as embodied and broadly described, this disclosure provides a method for allocating radio resources in a mobile communication system, the method comprising transmitting first information to a network, wherein the first information is utilized by the network to allocate radio resources to a mobile terminal for allowing communication between the mobile terminal and the network, and receiving second information from the network, wherein the second information is related to an allocation of radio resources for the mobile terminal.

In one aspect, the first information is transmitted upon expiration of a timer. The first information may comprise priority information of a channel having data. In one aspect, the first information may comprise mobile terminal power information. In another aspect, the first information may comprise information related to an average number of retransmissions under a hybrid automatic repeat request (HARQ) scheme. In a further aspect, the first information may comprise information related to transmitting a full header packet under a header compression scheme. In yet another aspect, the first information may comprise information related to a transition between an idle period and an active period.

The idle period may be a silent period and the active period is a talk spurt during a voice call operation. The mobile terminal may be periodically allocated radio resources for transmitting the first information using the allocated radio resources.

The first information may be transmitted upon receiving a request to transmit the first information from the network. The second information may be received along with a NACK signal from the network, wherein the network transmits the NACK signal upon incorrectly receiving data from the mobile terminal. The second information may comprise an indicator for indicating to the mobile terminal the existence of paging information.

The second information may be received during a first frame of a set of time frames, wherein the first frame includes identities of all mobile terminals that are scheduled for data communication within the set of time frames. A mobile terminal may be in an inactive state during the other time frames of the set of time frames if the identity of the mobile terminal is not included in the first frame.

In one aspect, the second information may comprise information related to when the mobile terminal can transmit the first information. In another aspect, the second information may comprise information related to when the network can allocate the radio resources.

The first information may be transmitted on a portion of a random access channel the mobile terminal is allowed to use.

In accordance with another embodiment, a method for allocating radio resources in a mobile communication system comprises receiving first information from a mobile terminal, wherein the first information is utilized by a network to allocate radio resources to the mobile terminal for allowing communication between the mobile terminal and the network, and transmitting second information to the mobile terminal, wherein the second information is related to an allocation of radio resources for the mobile terminal.

It is to be understood that both the foregoing general description and the following detailed description are exemplary and explanatory, and are intended to provide further explanation of the claims.

The accompanying drawings, which are included to provide further understanding and are incorporated in and constitute a part of this specification, illustrate various exemplary embodiments and together with the description serve to explain the principles of this disclosure. Features, elements, and aspects that are referenced by the same numerals in different figures represent the same, equivalent, or similar features, elements, or aspects in accordance with one or more embodiments.

This disclosure relates to allocating radio resources in a mobile communication system.

The features in this disclosure may be implemented in a mobile communication system such as an E-UMTS. However, such may be also applied to other communication systems operating under different specifications. Some exemplary embodiments will now be described in detail.

The features of this disclosure provide better service to mobile terminals under the control of a wireless communication system. A base station may allocate radio resources to terminals, and the terminals may request the base station to effectively allocate the radio resources.

In order to allocate radio resources to terminals in a single cell, the base station may be informed of the data that each terminal waits to receive. In general, data to be transmitted in a downlink direction may be transferred from an access gateway (AG). Thus, the base station can recognize the amount of data to be transferred to each terminal through the downlink and allocate radio resources accordingly. In case of uplink data, the base station cannot know the amount of radio resources required by each terminal unless the terminal provides information regarding the data to be transferred through the uplink. Therefore, in order for the base station to properly allocate uplink radio resources to a terminal, the terminal may provide to the base station information related to the scheduling of radio resources.

Figure 4:
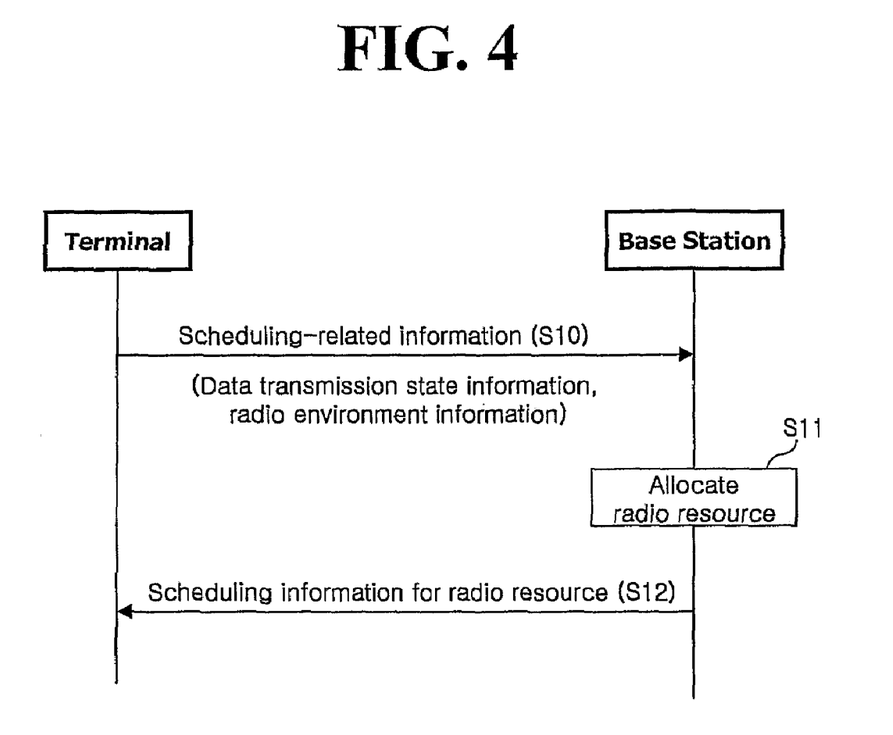
FIG. 4 illustrates an exemplary method for allocating radio resources in a mobile communication system in accordance with one embodiment.

FIG. 4 illustrates an exemplary method for allocating radio resources in a mobile communication system in accordance with one embodiment. Referring to FIG. 4, a terminal may transmit scheduling-related information to the base station. Thereafter, the base station may promptly allocate radio resources to the terminal so that the terminal can quickly transmit data using the allocated radio resources. Accordingly, a method for allocating radio resources in a mobile communication system will be described.

To help the base station properly allocate uplink radio resources, the terminal transmits information regarding a data transmission state to the base station (S10). The terminal may transmit the data transmission state information to the base station when a specific reference (condition) is met, or at a specific time.

The data transmission state information may include information regarding a priority level of a channel having data, and in particular, the data transmission state information may include information regarding a channel with the highest priority level among channels having data.

The data transmission state information may also include identification information for channels having data and/or label information. The label information may include a series of label values designated by the base station to each channel. The label value provides information as to whether a corresponding channel includes voice data or requires an error-free transmission. Accordingly, the base station can designate the same label value to different channels of different terminals.

The data transmission state information may also include identification information for the channel with the highest priority level among channels having data and/or information regarding an amount of data of each channel. In addition, the data transmission state information may include information regarding a total amount of data of the channels. The information included in the data transmission state information can be transmitted separately or together with other information to the base station.

The terminal may collect information for similar classes or similar types of channels and transfers them to the base station. In addition, because the amount of power to be used for uplink is limited, the terminal can include power information with the data transmission state information. The power information may comprise information regarding an amount of power available for use in addition to a power currently used for transmission, or a maximum amount of power the terminal can currently use for transmission.

Referring to FIG. 4, the terminal may also provide information regarding a radio environment (S10) to aid the base station in managing radio resources in a single cell more effectively. The terminal may transmit to the base station, information regarding an average success rate or transmission failure rate using a hybrid automatic repeat request (HARQ) scheme. Accordingly, the base station can calculate a required amount of radio resources to allocate to the terminal based on the received radio environment information. For example, when a HARQ retransmission procedure occurs an average of three times and the terminal requires radio resources of 1 Mhz for transmitting uplink data, the base station can assess that the radio resources of 1 MHz is to be allocated to the terminal for three time intervals.

Generally, a header compression scheme is used for a packet switching-based service (PS service), wherein most IP packets with respect to a service have almost the same header content. Thus, in providing the PS service, a full header packet is transmitted at every certain interval and changed content is transmitted during a remaining time interval. Accordingly, more uplink radio resources are required to transmit the full header packet.

For the features of this disclosure, when the header compression scheme is used for the PS service, the terminal transmits to the base station time information for the full header packet. The time information may comprise a transmission section, an interval and time, for example. Accordingly, based on the time information, the base station can allocate more resources at a time when the terminal is expected to transmit the full header packet.

In case of a voice call, a terminal user does not always speak. Thus, there are intervals during which no voice data is generated. A voice encoder may generate a packet for indicating a mute interval at a start point of the interval and transmits such packet. If the terminal recognizes the mute interval, the terminal may inform the base station to not allocate uplink radio resources to the terminal for transmitting voice data during a certain time. One of a MAC entity, a PDCP entity and an RLC entity of the terminal can recognize the packet indicating the mute interval by interpreting the packet or when receiving an indication of the mute interval from an upper layer. Thereafter, the base station can be informed accordingly.

In order for the terminal to transmit to the base station the above-described information, the terminal requires proper uplink radio resources. Therefore, this disclosure provides a method for effectively allocating radio resources to the terminal for transmitting the above-described information to the base station.

In accordance with one embodiment, the base station may arbitrarily allocate uplink radio resources to the terminal to allow the terminal to transmit information required for, or related to, transmission scheduling. For example, the base station may allocate uplink radio resources to the terminal through a channel for transmitting uplink radio resource allocation information, and instruct the terminal to preferentially use the allocated uplink radio resources to transmit scheduling information. Accordingly, the terminal reads the uplink radio resource allocation information, and when instructed to preferentially use a particular uplink radio resource to transmit scheduling information, the terminal transmits scheduling-related information using the particular uplink radio resource.

Furthermore, the base station may request a transmission of the scheduling-related information using signaling between MAC entities. The base station may request the terminal to transmit the scheduling-related information through the uplink radio resource allocation information channel, or by using a PDU transmitted between MAC entities. Upon receiving the request for transmitting the scheduling-related information from the base station, the terminal transmits the scheduling-related information using the allocated uplink radio resource.

In accordance with another embodiment, whenever a particular event set by the base station occurs, the terminal may transmit scheduling-related information to the base station. The base station may transmit measurement-related setting information to the terminal, wherein the terminal measures a radio environment based on the received measurement-related setting information. Subsequently, the terminal compares a measurement result with set conditions according to the measurement-related setting information. Thus, when certain conditions are met, the terminal transmits the measurement result or scheduling information to the base station.

In one aspect, the particular event or the measurement-related setting information may inform the terminal when to transmit the scheduling information. In another aspect, the particular event may indicate when an amount of data arrived at a particular channel of the terminal exceeds a particular reference value or is lower than the particular reference value. In another aspect, the particular event may indicate when a total amount of data arrived at a buffer of the terminal exceeds the particular reference value or is lower than the particular reference value. In another aspect, the particular event may indicate, based on an amount of radio resources currently allocated to the terminal, when a time required for using data stored in the buffer of the terminal exceeds the particular reference value or is lower than the particular reference value.

Information transmission by the terminal to the base station may be performed through a control information channel of the MAC entity or RRC entity. Accordingly, as shown in FIG. 4, the base station receives the scheduling-related information from the terminal (S10), allocates uplink and/or downlink radio resources for allowing the terminal to transmit uplink data (S11), and transmits scheduling information including the allocated radio resources to the terminal (S12).

Generally, uplink and downlink radio resources are classified depending on a transmission subject. The terminal may perform transmission through the uplink radio resources and the base station performs transmission through the downlink radio resources. In this respect, because only the base station performs transmission through the downlink radio resources and determines scheduling of radio resources, some of the downlink radio resources are allocated for transmitting the scheduling information to the terminal. Information related to data of a particular terminal, and which frequency and time to use for uplink transmission, may be transmitted to the terminal.

According to this disclosure, the uplink radio resources may be used by several terminals, wherein the several terminals are not connected to each other. Thus, the base station determines an allocation of radio resources for each terminal. Although the determined information is related to the uplink radio resources, the base station informs the terminals about the determination. The scheduling information regarding uplink radio resources, namely, information related to data of a particular terminal, and which frequency and time to use for uplink transmission, may be transmitted through the downlink radio resources. For this reason, a time point at which the scheduling information with respect to the uplink radio resources is transmitted through the downlink radio resources and a time point at which each terminal actually starts transmission through the uplink radio resources based on the scheduling information are different.

Accordingly, the base station may inform the terminals about the time difference between the transmission time point of the scheduling information and the actual usage time point. Here, the time difference can be transferred through system information of the base station.

Additionally, the base station can designate a specific time difference according to service characteristics used by each terminal and inform the terminals about the specific time difference. For example, a terminal with high processing capability can immediately process the scheduling information upon receiving it and start transmission through the uplink. However, a terminal having low processing capability cannot immediately perform the transmission. Therefore, a method for informing the specific time difference of each terminal is used.

During the processing procedures, the base station decodes the data transmitted by the terminal. If the decoding fails, the base station allocates the uplink radio resources to the terminal again. The base station may allocate the uplink radio resources to the terminal simultaneously with sending a NACK signal to the terminal. Alternatively, when the base station sends the NACK signal, it may inform the terminal whether to use the same resources as those used in the previous transmission.

When the base station instructs the terminal to use the same radio resources as those previously used, the terminal uses the same amount of radio resources previously used to perform the retransmission. Information regarding whether to use the same radio resources may be transmitted using a channel for transmitting scheduling information, or included in a channel for transmitting a NACK and ACK signal with respect to a terminal transmission.

In accordance with the features of this disclosure, the base station may send paging to the terminal. However, while the terminal transmits nothing through the uplink channel, the terminal may continuously receive downlink channels resulting in a battery usage time of the terminal being inevitably shortened. Therefore, the present disclosure provides a method for effectively sending paging to the terminal.

In order for the base station to effectively transmit paging, an unnecessary action by the terminal, of checking whether paging has been received, is removed. Therefore, in one method for effectively transmitting paging, the base station transmits paging (information) to the terminal by using the downlink channel for transmitting the scheduling information. The base station may directly include an identifier of the terminal the base station wants to page in the channel for transmitting the scheduling information.

Accordingly, the terminal can decode the scheduling information at a predetermined time, periodically. Thereafter, when the terminal discovers its identifier, the terminal determines that it has been paged and immediately responds to the base station. Moreover, when the terminal determines that it has been paged, the terminal begins transmitting a preset Channel Quality Indicator (CQI) or pilot signal. When the base station detects the CQI or pilot signal, the base station regards the signal as a response to its paging and operates accordingly.

In the E-UTRAN system, a minimum time unit for discriminating physical resources is a sub-frame of 0.5 ms. However, the total transmission time to the terminal may exceed 0.5 ms (e.g., if the NACK or ACK of the base station is large). Accordingly, transmitting the allocation information to the terminal with respect to the uplink or downlink physical resources at every sub-frame may cause severe overhead compared with user data actually transmitted.

To remedy this, the base station may designate one or more sub-frames as a single scheduling unit. For example, when the base station designates a scheduling unit of uplink radio resources as three sub-frames with respect to a specific terminal, and the terminal receives single uplink radio resource scheduling information, the terminal uses the scheduling information over three sub-frames. Here, the three sub-frames may use the same amount of radio resources, e.g., the same frequency band. By employing this method, the base station can effectively reduce the amount of scheduling information transmitted to the terminal.

The terminal may be informed of the scheduling unit when a single channel is set or when an RRC connection is formed between the terminal and the base station. When the base station allocates the uplink radio resources to a specific terminal and simultaneously informs the terminal that scheduling is valid during four sub-frames, the terminal can use the allocated uplink radio resources for four sub-frames. To operate more effectively, the base station no longer transmits the scheduling information to the terminal during the scheduling unit. Alternatively, the terminal no longer reads the channel for transmitting the uplink scheduling information during the scheduling unit. If a scheduling start point allocated to each terminal is respectively different, the base station may inform each terminal from what point the scheduling information should be read.

Figure 5:
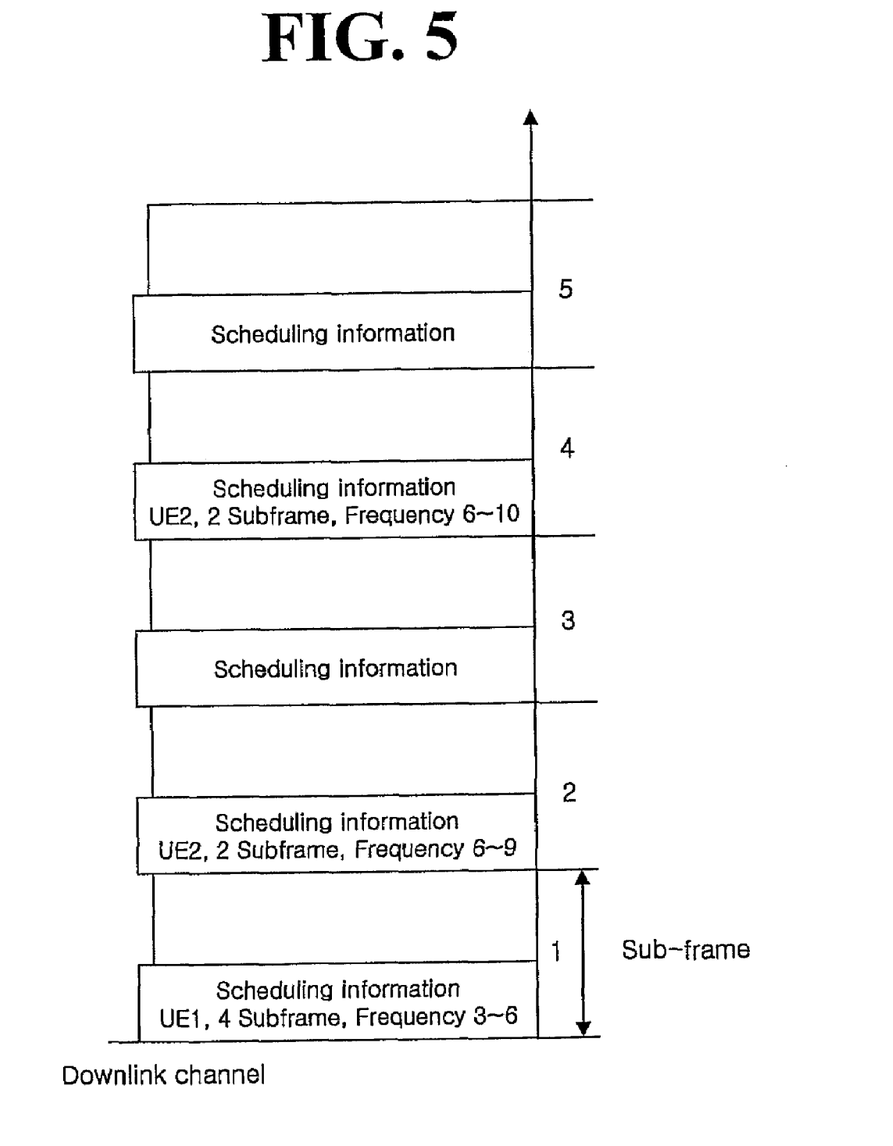
FIG. 5 illustrates an example of transmitting scheduling information through a downlink channel sub-frame in accordance with one embodiment.
Figure 6:
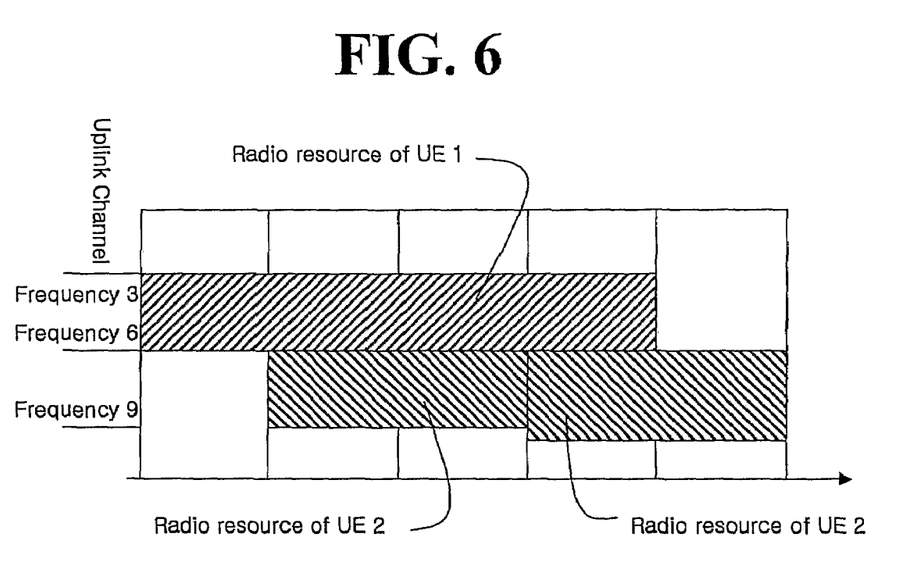
FIG. 6 illustrates an example of using uplink radio resources recognized by a terminal through scheduling information in accordance with one embodiment.

FIG. 5 illustrates an example of transmitting scheduling information through a sub-frame of a downlink channel in accordance with one embodiment. FIG. 6 illustrates an example of a terminal using uplink radio resources recognized through scheduling information in accordance with one embodiment.

Referring to FIG. 5, a first terminal (UE 1) may recognize at a first sub-frame of a downlink channel that uplink radio resources of frequencies 3 to 6 have been allocated for a length of four sub-frames. The UE 1 may recognize this allocation via scheduling information received during the first sub-frame. Accordingly, the UE 1 may use the allocated uplink radio resources during the four sub-frames, as shown in FIG. 6.

Referring to FIG. 5, a second terminal (UE 2) is allocated uplink radio resources during a second and fourth sub-frame. The UE 1 does not read scheduling information from the second to fourth sub-frames, but reads the scheduling information at a fifth sub-frame to check whether resources have been allocated to the UE 1. The UE 2 reads the scheduling information at the fourth sub-frame to check whether resources have been allocated to the UE 2.

Upon checking, because the UE 2 is allocated uplink radio resources at the fourth sub-frame for a length of two sub-frames, as shown in FIG. 5, the UE 2 uses the allocated uplink radio resources during two sub-frames, as shown in FIG. 6. The UE 2 may confirm that no resource is allocated to the UE 2 at the fifth sub-frame.

If the base station does not allocate resources to the terminals for a certain period, it may inform the terminals about a next scheduling time. During this period, the terminals do not check the scheduling information. The scheduling time may instruct the terminals to check a certain sub-frame or inform when (i.e., after how many sub-frames) the scheduling information should be checked.

In one aspect, allocation of radio resources to the terminal during each sub-frame may not be necessary. For example, when the terminal requires an average of one frequency band per sub-frame, a method for allocating two frequency bands every two sub-frames can be used. For example, when the base station allocates radio resources starting from an x-th sub-frame to a 10-th sub-frame, the base station may transmit the radio resources at even numbered sub-frames among the 10 sub-frames, and allocate two frequency bands at every even-numbered sub-frame. Accordingly, the terminal uses radio resources at an average of one frequency band per sub-frame.

To support this method, the base station may inform the terminal about a transmission-allowed process and a transmission-not-allowed process. The base station may inform the terminal about the processes at an initial stage of a call, whenever a channel is set, or whenever the base station transmits the scheduling information to the terminal. Accordingly, when the terminal is allocated corresponding radio resources during one or more sub-frame periods, the terminal uses the radio resources at the sub-frame corresponding to the process set for using the radio resources. For example, if the total number of processes of the terminal is 6, a first process is used at a first sub-frame, a second process is used at a second sub-frame, a third process is used at a third sub-frame, and so forth until a sixth process is used at a sixth sub-frame. Afterwards, for subsequent sub-frames, the order of processes reverts back to the beginning, such that the first process is used at a seventh sub-frame, and so on.

In one aspect, the base station determines that the terminal can use radio resources at processes 1, 3 and 5, and a first frequency band is allocated to the terminal at a first sub-frame for 30 sub-frames. Here, the terminal uses the radio resources only during a time interval at which the processes allowed to be used are activated. Thus, the terminal may use the radio resources during the sub-frames 1, 3, 5, 7, . . . etc., and does not use the radio resources during the other intervals.

From the viewpoint of the downlink physical channel, the scheduling information is not used for transmitting actual user data, and therefore may be considered as overhead. Thus, a method for reducing an amount of scheduling information is desirable. The scheduling information can be expressed in a simpler manner. For this purpose, a bitmap-type scheduling information configuration method may be used.

In accordance with this disclosure, the base station may inform each terminal about an interval during which scheduling information is transmitted, a time point at which the scheduling information is transmitted, and a location of resource allocation information for the terminal at the time point. Accordingly, the terminal may read the scheduling information during the corresponding interval and time point, and specifically reads a portion of the scheduling information corresponding to the terminal. When resources are allocated to the terminal, the terminal receives data or transmits uplink data using the allocated resources. If no radio resources are allocated, the terminal waits to receive the next transmission of scheduling information. The location of the resource allocation information for the terminal indicates which bits correspond to the terminal among a plurality of bits in a bit stream. Moreover, the radio resources allocated to the terminal may be radio resources fixedly designated at an initial stage of setting a call or at a middle stage of the call.

In accordance with this disclosure, if there are four terminals, it may be that a first terminal is allocated a first position, a second terminal is allocated a second position, a third terminal is allocated a third position, and a fourth terminal is allocated a fourth position, for example. Accordingly, if scheduled user information received during a particular sub-frame is 0011, then no radio resources are allocated to the first and second terminals, but radio resources are allocated to the third and fourth terminals. Here, several methods may exist for informing the terminal about the allocated resources from the base station.

According to a first method, the base station informs each terminal of information regarding the actually allocated radio resources after transmitting scheduled user information. In this case, the information regarding allocated radio resources follow the order of terminals known to have been allocated radio resources. In this example, the first radio resource allocation information corresponds to the third terminal and the second radio resource allocation information corresponds to the fourth terminal.

According to another method, for more various scheduling, the base station may combine several sub-frames and provide information regarding which terminals are allocated radio resources to the sub-frames at an initial stage of the sub-frames. Several sub-frames may be grouped to a single hyper frame, and the information regarding which terminals are allocated radio resources during the hyper frame are provided at the first sub-frame of the hyper frame.

The terminals read the first sub-frame of hyper frame to check if the information (e.g., a list) regarding which terminals are allocated radio resources include their identifiers, respectively. If the first sub-frame of hyper frame includes their respective identifiers, the terminals receive the following sub-frames. If the first sub-frame of hyper frame does not include their respective identifiers, the terminals wait for a first sub-frame of next hyper frame, or transmission of information regarding which terminals are allocated radio resources. To provide the information (or list) regarding which terminals are allocated radio resources in the hyper frame, the aforementioned bitmap method may be used.

To effectively use radio resources of a single cell, as mentioned above, the terminal transmits the scheduling-related information to the base station. However, this can contribute to some waste of radio resources and some undesirable consumption of terminal power. For example, a situation where the base station is loaded will be considered. Here, data for a first service has reached a first terminal from an upper layer. Accordingly, the first terminal would transmit scheduling-related information to the base station to be allocated radio resources. However, in the cell where the first terminal is located, other terminals may want to transmit data. Thus, if data to be transmitted by the other terminals is for a service with a higher priority level than the first service for which the first terminal wants to transmit data for, the base station would preferentially allocate radio resources to the service with the priority level higher than the first service. Here, it is possible that the base station may not allocate radio resources to the first terminal if a total amount of radio resources of the cell is limited, or until more radio resources can be provided. Therefore, in this situation, continuous transmission of the scheduling-related information by the first terminal to the base station is a waste of uplink radio resources of the cell. Accordingly, this disclosure provides a method for effectively transmitting the scheduling-related information to the base station while preventing (or minimizing) the waste of the radio resources.

Figure 7:
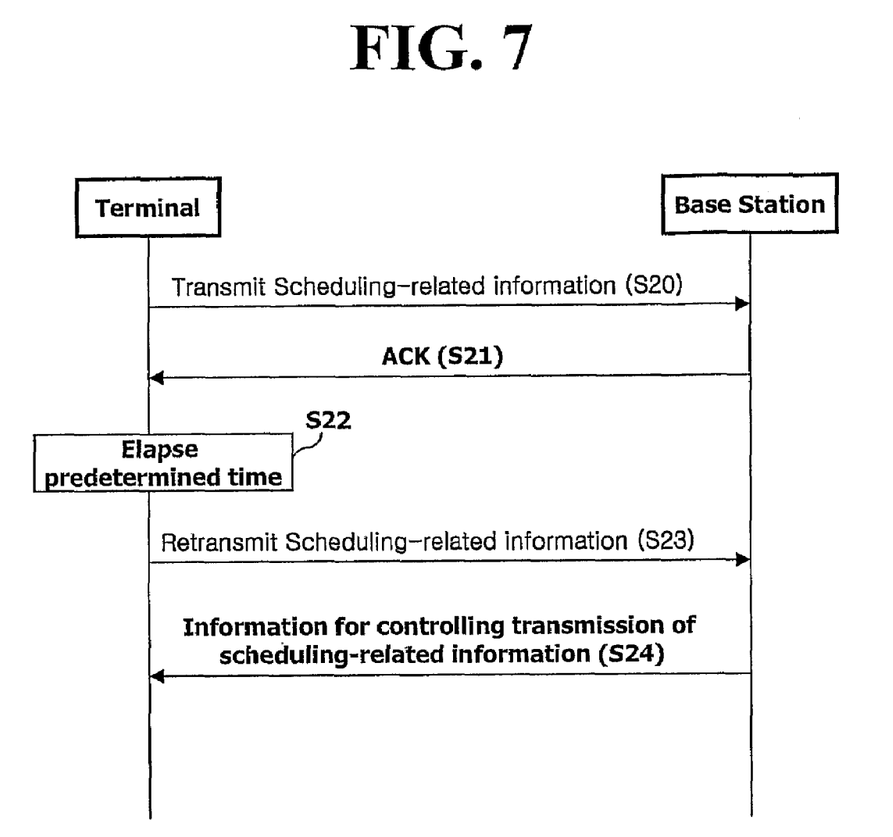
FIG. 7 illustrates a method for transmitting scheduling-related information to a base station in accordance with one embodiment.

FIG. 7 illustrates a method for transmitting scheduling-related information to a base station in accordance with one embodiment. Referring to FIG. 7, a terminal transmits scheduling-related information to a base station (S20). In response, the base station transmits an acknowledgment (ACK) with respect to the scheduling-related information (S21). Thereafter, the terminal waits for an allocation of radio resources from the base station. If the terminal fails to receive an allocation of radio resources from the base station after a predetermined time has elapsed (S22), the terminal re-transmits the scheduling-related information to the base station (S23).

The scheduling-related information may be transmitted through a synchronized random access channel. The terminal informs the base station about its access through the synchronized random access channel and transmits scheduling-related information using radio resources allocated by the base station. The terminal may also inform the base station that the terminal requires radio resources. In using the random access channel, the terminal may use one or more fields for its identifier and other fields for transmitting the scheduling-related information.

The time the terminal waits prior to re-transmitting the scheduling-related information (standby time) may be established by the base station. The base station may inform the terminal about the standby time individually or designate a standby time for each channel. Stand-by time information may be transmitted to terminals through system information. So, the UE has to wait at least during the time indicated by the time information after sending scheduling related information.

Referring to FIG. 7, although the base station successfully receives the scheduling-related information from the terminal, if a priority level of the corresponding terminal is low or if the base station cannot immediately allocate radio resources to the corresponding terminal, the base station may transmit information for controlling a transmission of the scheduling-related information to the terminal (S24). The information for controlling transmission of the scheduling-related information may inform when the terminal can re-transmit the scheduling-related information.

The information for controlling transmission of the scheduling information may provide at least one of an amount of time during which the terminal should wait prior to re-transmitting the scheduling-related information, a time when the base station can provide radio resources to the terminal, and a time when the base station can provide the radio resource allocation information regarding the terminal to the terminal. When the terminal receives the information for controlling transmission of the scheduling-related information from the base station, the terminal does not transmit the scheduling-related information during a predetermined time according to the received information.

And after waiting a predetermined time, if there is still a need to send scheduling related information, the UE may transmit scheduling related information.

Meanwhile, when a plurality of terminals are present in a single cell and simultaneously request allocation of radio resources from the base station through a random access channel, the base station may have some difficulty detecting the signals of the terminals. Therefore, the efficiency of the random access channel may deteriorate.

Thus, in accordance with this disclosure, the random access channel that can be used by each terminal may be divided. Thus, after dividing the random access channels into several group, the base station informs the UEs about which random access channel is allowed to be used by which UE. Therefore, the terminal may use its allocated random access channel when needed. The base station may divide the random access into a certain number and the terminals use the random access channel at an interval identical to their identifier, respectively. For example, when the base station divides the random access channel into four parts, resources of a first random access channel can be used by terminals having a remainder of 0 when dividing the identifiers of the terminals by 4. Moreover, resources of a second random access channel can be used by terminals having a remainder of 1 when dividing the identifiers of the terminals by 4. Notably, the resources of the random access channel can be divided by time or frequency band, and is not limited to the above-described scheme.

In addition, the resources of the random access channel can be allocated by terminals. In particular, a synchronous random access channel has a larger amount of information that can be transferred or detected compared to an asynchronous random access channel. Thus, the base station allocating a specific signature sequence to each terminal would have the same effect as allocating resources of the random access channel to each terminal.

Accordingly, in this disclosure, the base station may allocate resources of the synchronous random access channel to each terminal. Here, upon synchronizing with the base station, if a terminal has data to be transmitted through an uplink channel, the terminal uses the resources of the synchronous random access channel allocated to each terminal. When the terminal transmission from the synchronous random access channel allocated to each terminal is detected, the base station recognizes the transmission through the random access channel as a request for allocating radio resources. If necessary, the base station allocates radio resources to the terminal. Here, various resources of the synchronous random access channel can be allocated to each terminal, and for example, a specific signature sequence can be allocated to each terminal or to each logical channel for UEs.

As so far described, the present disclosure provides a method for allowing the terminal to effectively and quickly transmit scheduling-related information to the base station and the base station to effectively and quickly transmit scheduling information to the terminal. Accordingly, more terminals can be guaranteed a fast data transmission.

Although the present disclosure is described in the context of mobile communications, the features of this disclosure may also be used in any wireless communication systems using mobile devices, such as PDAs and laptop computers equipped with wireless communication capabilities. Moreover, the use of certain terms to describe the features of this disclosure should not limit the scope to certain type of wireless communication system, such as UMTS. The present teachings are also applicable to other wireless communication systems using different air interfaces and/or physical layers, for example, TDMA, CDMA, FDMA, WCDMA, etc.

The exemplary embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.).

Code in the computer readable medium is accessed and executed by a processor. The code in which the exemplary embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of this disclosure, and that the article of manufacture may comprise any information bearing medium known in the art.

The foregoing embodiments and advantages are merely exemplary and are not to be construed as limiting. The present teachings can be readily applied to other types of apparatuses. This description is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

The invention claimed is:

1. A method for allocating radio resources in a mobile communication system, the method performed by a mobile terminal and comprising:
   transmitting first information to a network, wherein the first information is utilized by the network to allocate radio resources to a mobile terminal for allowing communication between the mobile terminal and the network; and
   receiving second information from the network, wherein the second information is related to an allocation of radio resources for the mobile terminal,
   wherein the first information is transmitted upon expiration of a timer or upon receiving a request to transmit the first information from the network,
   wherein the first information comprises information related to an average number of retransmissions under a hybrid automatic repeat request (HARQ) scheme and mobile terminal power information comprising an amount of power available for use by the mobile terminal,
   wherein the second information is received during a first frame of a set of time frames, wherein the first frame includes identities of all mobile terminals that are scheduled for data communication within the set of time frames, and
   wherein the second information comprises at least an indicator for indicating to the mobile terminal the existence of paging information or information related to when the network can allocate the radio resources.

2. The method of claim 1, wherein the mobile terminal is periodically allocated radio resources for transmitting the first information using the allocated radio resources.

3. The method of claim 1, wherein the second information is received along with a NACK signal from the network, wherein the network transmits the NACK signal upon incorrectly receiving data from the mobile terminal.

4. The method of claim 1, wherein a mobile terminal is in an inactive state during the other time frames of the set of time frames if the identity of the mobile terminal is not included in the first frame.

5. The method of claim 1, wherein the second information comprises information related to when the mobile terminal can transmit the first information.

6. The method of claim 1, wherein the first information is transmitted on a portion of a random access channel the mobile terminal is allowed to use.

7. A method for allocating radio resources in a mobile communication system, the method performed by a network and comprising:
   receiving first information from a mobile terminal, wherein the first information is utilized by the network to allocate radio resources to the mobile terminal for allowing communication between the mobile terminal and the network; and
   transmitting second information to the mobile terminal, wherein the second information is related to an allocation of radio resources for the mobile terminal,
   wherein the first information is received upon expiration of a timer or upon transmitting a request for the first information to the mobile terminal,
   wherein the first information comprises information related to an average number of retransmissions under a hybrid automatic repeat request (HARQ) scheme and mobile terminal power information comprising an amount of power available for use by the mobile terminal, wherein the second information is transmitted during a first frame of a set of time frames, wherein the first frame includes identities of all mobile terminals that are scheduled for data communication within the set of time frames, and wherein the second information comprises at least an indicator for indicating to the mobile terminal the existence of paging information or information related to when the network can allocate the radio resources.

8. The method of claim 7, wherein the mobile terminal is periodically allocated radio resources for transmitting the first information using the allocated radio resources.

9. The method of claim 7, wherein the second information is transmitted along with a NACK signal from the network, wherein the network transmits the NACK signal upon incorrectly receiving data from the mobile terminal.

10. The method of claim 7, wherein the mobile terminal is in an inactive state during the other time frames of the set of time frames if the identity of the mobile terminal is not included in the first frame.

11. The method of claim 7, wherein the first information is received on a portion of a random access channel the mobile terminal is allowed to use.

* * * * *